United States Patent [19]
Dippold

[11] 3,716,735
[45] Feb. 13, 1973

[54] ELECTRICAL BRUSH ASSEMBLY
[75] Inventor: William L. Dippold, St. Marys, Pa.
[73] Assignee: Stackpole Carbon Comapny, St. Marys, Pa.
[22] Filed: Aug. 25, 1971
[21] Appl. No.: 174,690

[52] U.S. Cl. ..................................................310/240
[51] Int. Cl. ..............................................H02k 13/00
[58] Field of Search......310/219, 229, 240, 239, 242, 310/245, 247

[56] References Cited

UNITED STATES PATENTS

| 3,267,312 | 8/1966 | Redick | 310/239 |
|---|---|---|---|
| 2,472,018 | 5/1949 | Johnson | 310/240 |
| 3,387,155 | 6/1968 | Krulls | 310/240 |
| 3,590,297 | 6/1971 | Smith | 310/239 |
| 3,278,777 | 10/1966 | Grooms | 310/240 |

FOREIGN PATENTS OR APPLICATIONS

| 834,716 | 3/1952 | Germany | 310/240 |
|---|---|---|---|

*Primary Examiner*—R. Skudy
*Attorney*—Brown, Murray, Flick & Peckham

[57] ABSTRACT

An electric brush is slidably disposed in the socket of a holder, with a spring compressed between the inner ends of the brush and socket. The side of the brush has a recess near its inner end beside an opening in the holder. Extending into this recess is the free end of a tongue that is joined to the holder to hold the brush retracted against the pressure of the spring. A similar brush arrangement is spaced far enough from the one just described for an armature or the like to be inserted between the brushes without touching them. Then the tongues are bent out of the brush recesses so that the springs can expand and move the brushes into engagement with the armature.

3 Claims, 3 Drawing Figures

PATENTED FEB 13 1973

3,716,735

INVENTOR.
WILLIAM L. DIPPOLD

BY

Brown, Murray, Flick & Peckham
ATTORNEYS.

ELECTRICAL BRUSH ASSEMBLY

In assembling brushes and a motor armature or other rotating current collector it is necessary to hold the brushes in a retracted position so that the armature can be inserted between them. Various ways of holding the brushes back have been used, such as U-shape clips or rubber bands. These later have to be removed and sometimes in removing them they accidentally get into the equipment. Also, the procedure for retracting the brushes adds an operation and additional items and slows down the assembly.

It is among the objects of this invention to provide an electric brush assembly in which the brushes can be quickly placed in retracted position, in which extra parts for holding the brushes retracted are not required, and in which the brush retracting means are quickly released from the brushes.

The preferred embodiment of the invention is illustrated in the accompanying drawings, in which FIG. 1 is an end view of a motor, partly broken away, with the brushes retracted;

Figure 1:
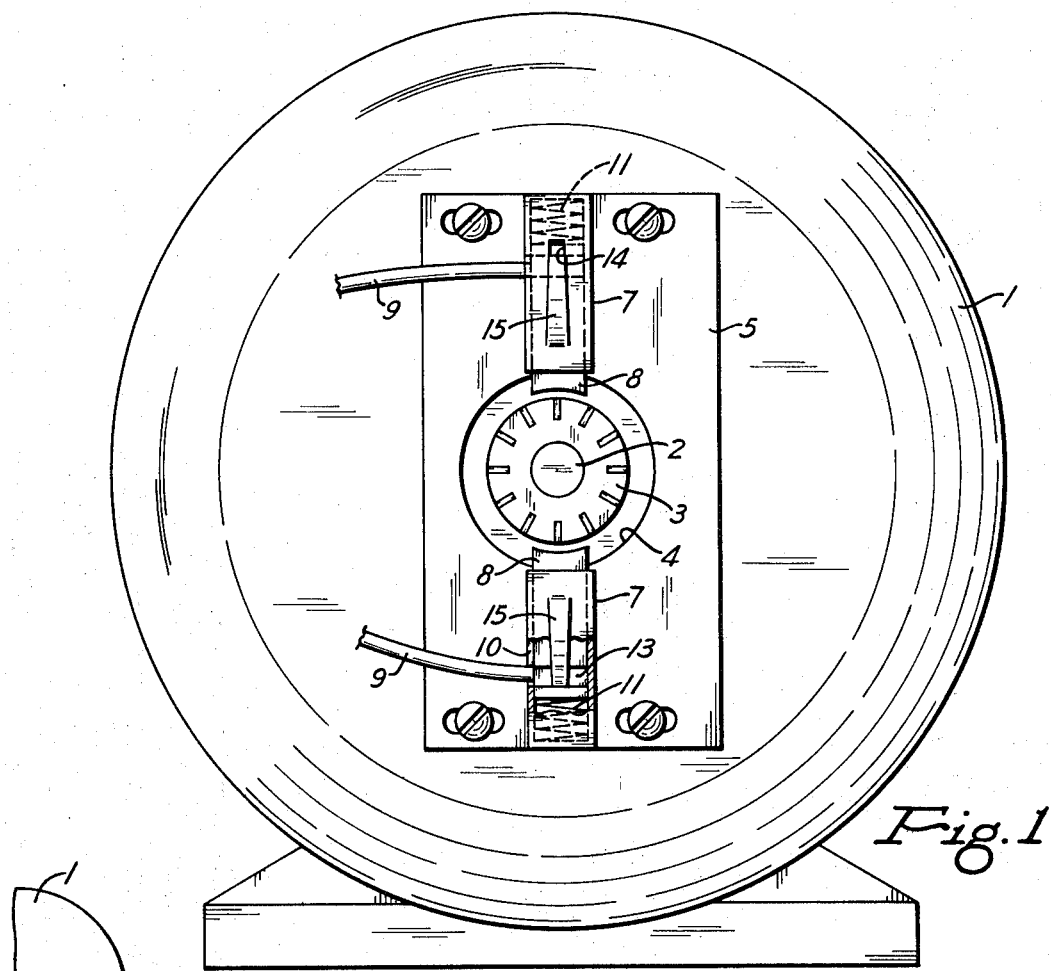
Figure 2:
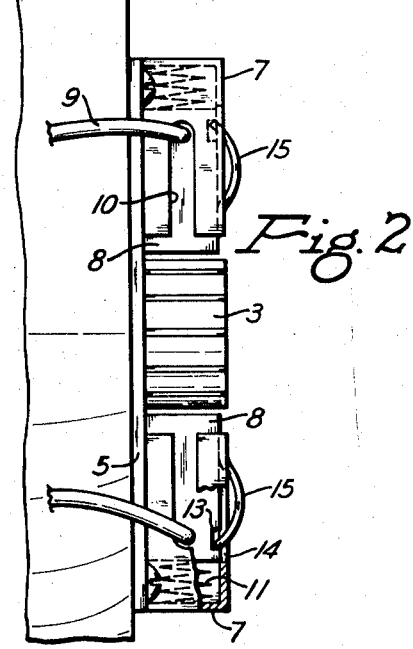
FIG. 2 is a fragmentary side view partly broken away.

Referring to FIGS. 1 and 2 of the drawings, an electric motor is shown, although it could just as well be an electric generator or some other rotating electrical machine provided with a current collector. Projecting from one end of the motor housing 1 is the rotor shaft 2 that carries the armature 3 of the motor. This armature extends through a central opening 4 in a plate 5 screwed to the adjoining end of the motor housing. Each end of the plate rigidly supports a brush holder 7, of metal, which generally will be rectangular in cross section but could be round. Each holder is provided with a socket, the open end of which is at the armature end of the holder. The two sockets are diametrically opposite each other and of course spaced from the armature. Slidably mounted in each holder is an electric brush 8 that may be connected in the motor circuit by means of a flexible pigtail 9 extending out through a slot 10 in one side of the holder. Between the inner end of the brush and the inner end of the socket there is a spring, such as a coil spring 11, urging the brush toward the armature.

It is a feature of this invention that means are provided for temporarily holding the brushes in retracted positions where they will not interfere with insertion of the armature between them. Accordingly, one side of each brush, preferably its front side, is provided near its inner end with a recess 13 (FIG. 2) that may be produced by making a small indentation in the brush or by forming a transverse groove in it. Beside this recess the brush holder is provided with an opening 14, through which extends the free end of a tongue 15, the outer end of which is joined to the holder. The tongue and opening are formed most easily and cheaply by simply striking out a piece of the side of the holder to form a tongue and slot in one operation. One end of such a tongue is integrally connected to the holder near its armature end. The free end of the tongue is bent through side opening 14 and into the brush recess as shown in FIG. 2, and it is positioned so that it will hold the brush retracted with the spring compressed. The two brushes are retracted into their holders far enough in this manner to keep them out of the way of the armature when it is inserted through the hole in the plate 5 and into the area between the brushes.

Figure 3:
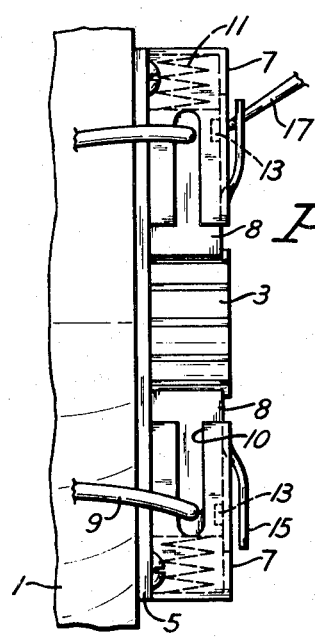
FIG. 3 is a fragmentary side view showing the brushes released against the motor armature.

After the armature is in place, the two tongues 15 are removed from the brush recesses, whereupon the springs expand and press the brushes against the armature in the usual manner as shown in FIG. 3. Removal of the tongues from the recesses requires only bending their free ends outwardly. This is facilitated by arching the central portions of the tongues away from the holders to provide openings in which a suitable pointed instrument 17 can be inserted and then used as a wedge or lever to bend the tongues outwardly.

It will be seen that with this invention the brushes are placed in retracted position by the same operation that inserts them in the holders; that is, they are simply pushed into the sockets far enough for the previously inwardly bent free ends of the tongues to snap into the brush recesses. In other words, the act of inserting the brushes in the holders also locks them in retracted position. The brushes likewise are quickly released by a very simple operation as explained. There are no extra parts to assemble and then dispose of, so time and cost are reduced. In addition, there is no danger of the brush retractors getting into the final assembly.

According to the provisions of the patent statutes, I have explained the principle of my invention and have illustrated and described what I now consider to represent its best embodiment. However, I desire to have it understood, that within the scope of the appended claims, the invention may be practiced otherwise than as specifically illustrated and described.

I claim:

1. An electrical brush assembly comprising a holder provided with a socket, a brush slidably disposed in the socket and having an outer end adjacent the open end of the socket, a spring in the socket compressed between the inner ends of the brush and socket, the side of the brush having a recess therein near its inner end and the holder having an opening beside the recess, and a tongue joined to the holder and having a free end extending through said holder opening and into said brush recess to hold the brush retracted in the holder against the pressure of the spring, said tongue and holder opening being formed by a struck-out piece of the side of the holder, and said tongue being bendable outwardly to remove its free end from said recess so that the spring can expand and move the brush farther away from the inner end of the socket.

2. An electrical brush assembly according to claim 1, in which the central part of said tongue is arched away from the holder to provide an opening therebetween for insertion of an instrument to remove the free end of the tongue from the brush recess, said assembly including a like holder and spring and tongue and retracted recessed brush disposed in alignment with the first-mentioned holder with the outer ends of the retracted brushes facing each other and spaced apart far enough to freely receive a rotatable current collector between them, and a plate secured to said holders and supporting them, whereby removal of said tongues from the brush recesses will permit the brushes to be moved by said springs toward each other.

3. An electrical brush assembly comprising a holder provided with a socket, a brush slidably disposed in the socket and having an outer end adjacent the open end of the socket, a spring in the socket compressed between the inner ends of the brush and socket, the side of the brush having a recess therein near its inner end and the holder having an opening beside the recess, and a tongue joined to the holder and having a free end extending through said holder opening and into said brush recess to hold the brush retracted in the holder against the pressure of the spring, the central part of said tongue being arched away from the holder to provide an opening therebetween for insertion of an instrument to remove the free end of the tongue from the brush recess so that the spring can expand and move the brush farther away from the inner end of the socket.

* * * * *